UNITED STATES PATENT OFFICE.

ARNOLD KUBACH AND ORLANDO D. CASE, OF HARTFORD, CONNECTICUT.

PROCESS OF PRESERVING MEAT.

SPECIFICATION forming part of Letters Patent No. 247,768, dated October 4, 1881.

Application filed May 14, 1881. (No specimens.)

*To all whom it may concern:*

Be it known that we, ARNOLD KUBACH and ORLANDO D. CASE, of Hartford, in the county of Hartford and State of Connecticut, have invented certain new and useful Improvements in Process for Preserving Meat; and we do hereby declare that the following is a full, clear, and exact description thereof, whereby a person skilled in the art can make and use the same.

Our invention relates to a novel method of preserving meat for use, so that it shall have all the taste and properties of fresh and unpreserved meat as prepared for market in the usual manner.

The object of our invention is to provide a means of keeping meat for a long time after being killed, so that it can be sent to long distances without spoiling, and without the use of ice.

Our invention consists in saturating the meat with the fumes of heated rosin in a close receptacle.

The pieces of meat to be prepared are suspended freely in a closed chamber, into which the fumes of the heated rosin are conducted by a tube leading from a retort containing the rosin; or the rosin may be heated directly under the chamber and the fumes be allowed to rise directly upward. The meat is subjected to the fumes a sufficient length of time to thoroughly penetrate it in every part, which time will vary with the size of the pieces and the temperature of the rosin, and also with the density and intensity of the fumes, from two to six hours being generally sufficient to perfectly preserve meat for one or two months in warm weather.

Meat thus prepared has a tendency to dry up rather than decompose, and by merely removing the outer surface can at any time be used, and after being cooked cannot be distinguished from freshly-killed food.

What we claim as our invention is—

1. The art of preserving meat by subjecting it to the fumes of heated rosin, substantially as described.

2. Meat impregnated with the fumes of heated rosin for preserving the same, substantially as herein set forth.

ARNOLD KUBACH.
ORLANDO D. CASE.

Witnesses:
EDWIN F. DIMOCK,
THEO. G. ELLIS.